_United States Patent_ [19]

Nakazeki et al.

[11] 4,285,312
[45] Aug. 25, 1981

[54] AIR FLOW MEASURING DEVICE FOR INTERNAL COMBUSTION ENGINES

[75] Inventors: Tsugito Nakazeki; Yoshinobu Yasuda, both of Iwata, Japan

[73] Assignee: NTN Toyo Bearing Co., Ltd., Osaka, Japan

[21] Appl. No.: 29,027

[22] Filed: Apr. 11, 1979

Related U.S. Application Data

[63] Continuation of Ser. No. 710,127, Jul. 30, 1976, abandoned.

[30] Foreign Application Priority Data

Jul. 31, 1975 [JP] Japan ............................ 50-93971

[51] Int. Cl.$^3$ ............................................ E02D 11/08
[52] U.S. Cl. ................................ 123/378; 123/336; 123/389; 123/327
[58] Field of Search ......... 123/103 R, 97 R, 139 AW, 123/336, 319, 378, 389, 327; 137/468, 489; 261/50 A

[56] References Cited

U.S. PATENT DOCUMENTS

| | | | |
|---|---|---|---|
| 2,668,697 | 2/1954 | Sager | 137/468 |
| 3,047,010 | 7/1962 | Rothfuss | 137/489 |
| 3,650,258 | 3/1972 | Jackson | 261/50 A |
| 3,852,381 | 12/1974 | Mick | 261/50 A |
| 4,153,018 | 5/1979 | Kimata et al. | 123/103 R |

_Primary Examiner_—Craig R. Feinberg
_Attorney, Agent, or Firm_—Hall & Houghton

[57] ABSTRACT

A gas flow measuring mechanism having a feedback control mechanism comprising a flow detection valve and a flow control valve which are in series with each other and placed in a channel, an area flowmeter for keeping constant the difference in the pressures existing on opposite sides of said flow detection valve and determining the amount of incoming air by the opening area of the flow detection valve, a pressure-sensitive amplifier mechanism for sensing the deviation of the difference in the pressures existing on opposite sides of the flow detection valve from a set pressure difference on the basis of the displacement of a pressure setting diaphragm, and a valve opening mechanism for controlling the opening and closing of the flow detection valve, wherein a bellows enclosing a gas at a reference temperature and under a reference pressure and having an effective area equal to (effective area of pressure difference setting diaphragm)×(reference pressure difference at a reference temperature and under reference pressure)÷(pressure of enclosed gas) is interlocked to the pressure difference setting diaphragm so as to make density compensation.

6 Claims, 3 Drawing Figures

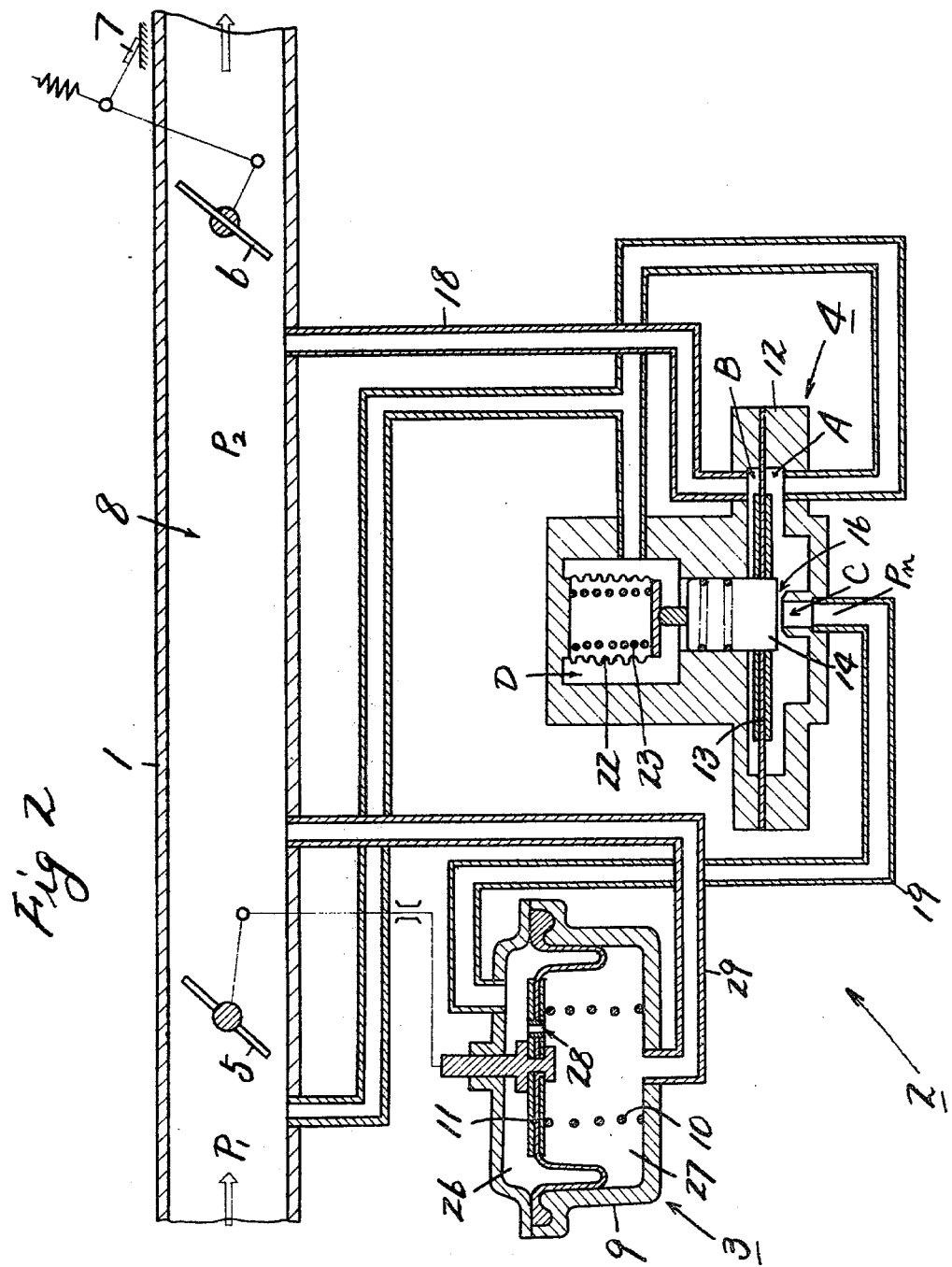

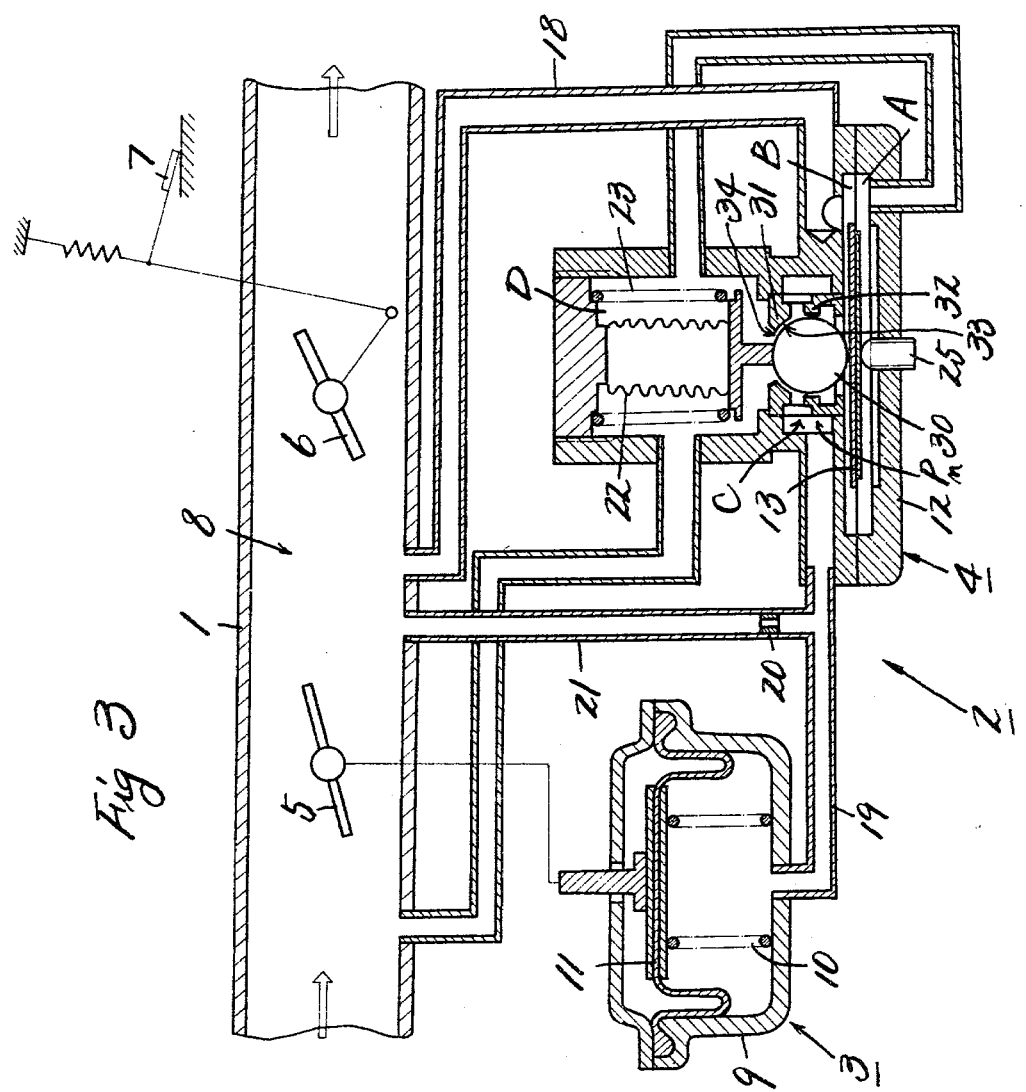

AIR FLOW MEASURING DEVICE FOR INTERNAL COMBUSTION ENGINES

This is a continuation, of application Ser. No. 710,127, filed July 30, 1976 now abandoned.

RELATED APPLICATION

This application is related to application Ser. No. 710,126, filed July 30, 1976.

BACKGROUND OF THE INVENTION (a) Field of the Invention

The present invention relates to a device for measuring the amount of flow of air or other gas being sucked into an internal combustion engine or other unit, said device being arranged so that in order that, for example, the weight ratio of suction air to fuel may be accurately controlled so as to be kept at a constant value, the difference in the suction air pressures existing on opposite sides of an air throttle valve is kept constant by a feedback control device using a fluid, the amount of incoming air being determined by the opening area of said throttle valve.

More particularly, the present invention relates to a device for measuring the weight of air or other gas being sucked into an internal combustion engine or other unit by automatically compensating for the influence of density variations due to the gas temperature and pressure variations.

(b) Description of the Prior Art

In internal combustion engines, e.g., for automobiles, it is particularly important to engine efficiency and exhaust gas coutermeasure to accurately control the weight ratio of suction air to fuel so as to keep it at a constant value. To this end, a high precision measuring device for measuring the amount of suction air is required. Generally, the conventional suction air flow measuring device for this purpose comprises a flow control valve placed in an air suction pipe, a flow detection valve placed upstream of said flow control valve, said two valves defining an intermediate chamber, and means for controlling the pressure in said intermediate chamber so as to keep constant the difference in the pressures existing on opposite sides of said flow detection valve, so that the amount of suction air is proportional to the opening area of the flow detection valve, the amount of flow of air being thus determined by said opening area. The so-called area flowmeter system is known. The control of the flow detection valve by this system is performed by employing a pressure difference control servo-mechanism based on the feedback system wherein when the difference in the pressures existing on opposite sides of the valve is deviated from a predetermined value, the deviation is detected by the pressure difference setting diaphragm of the servo-mechanism, the detected value being then amplified by a fluid mechanism, the resulting amplified output being used to increase or decrease the degree of opening of the flow detection valve so as to bring said pressure difference to said predetermined value.

However, the suction air varies in its specific gravity with its pressure and temperature. Therefore, in order to accurately measure the amount of flow of air, a mechanism which compensates for temperature and pressure is required. Such mechanisms which have heretofore been used are in two types; electrical and mechanical. In either type, there are problems in terms of accuracy and cost. Japanese Patent application No. 107455/73 proposes this kind of compensation mechanism using the above-described feedback control mechanism having incorporated therein a compensation section designed so that compensation for pressure is made by a pressure sensitive device and compensation for temperature is made by a heat sensitive device. The mechanism, however, has problems in terms of the number of parts and construction.

SUMMARY OF THE INVENTION

The present invention provides a gas flow measuring mechanism having a feedback control mechanism comprising a flow detection valve and a flow control valve which are in series with each other and placed in a channel, an area flowmeter for keeping constant the difference in the pressures existing on opposite sides of said flow detection valve and determining the amount of incoming air by the opening area of the flow detection valve, a pressure-sensitive amplifier mechanism for sensing the deviation of the difference in the pressures existing on opposite sides of the flow detection valve from a set pressure difference on the basis of the displacement of a pressure difference setting diaphragm, and a valve opening mechanism for controlling the opening and closing of the flow detection valve, wherein a bellows enclosing a gas at a reference temperature and under a reference pressure and having an effective area equal to: (effective area of pressure difference setting diaphragm)×(reference pressure difference at reference temperature and under reference pressure)÷(pressure of enclosed gas) is interlocked to the pressure difference setting diaphragm so as to make density compensation.

FEATURES OF THE INVENTION

The present invention is intended to provide a suction air flow measuring device having high accuracy; and to provide a suction air flow measuring device of the area flowmeter type incorporating a feedback control mechanism, whereby the compensation for the pressure and temperature of suction air is made by a simple mechanism.

BRIEF DESCRIPTION OF THE DRAWINGS

FIG. 2 is a schematic sectional view showing the principal components of another embodiment of the invention; and FIG. 3 is a sectional view of a preferred embodiment of a valve applied to the embodiments shown in FIGS. 1 and 2.

DESCRIPTION OF THE PREFERRED EMBODIMENTS

Figure 1:
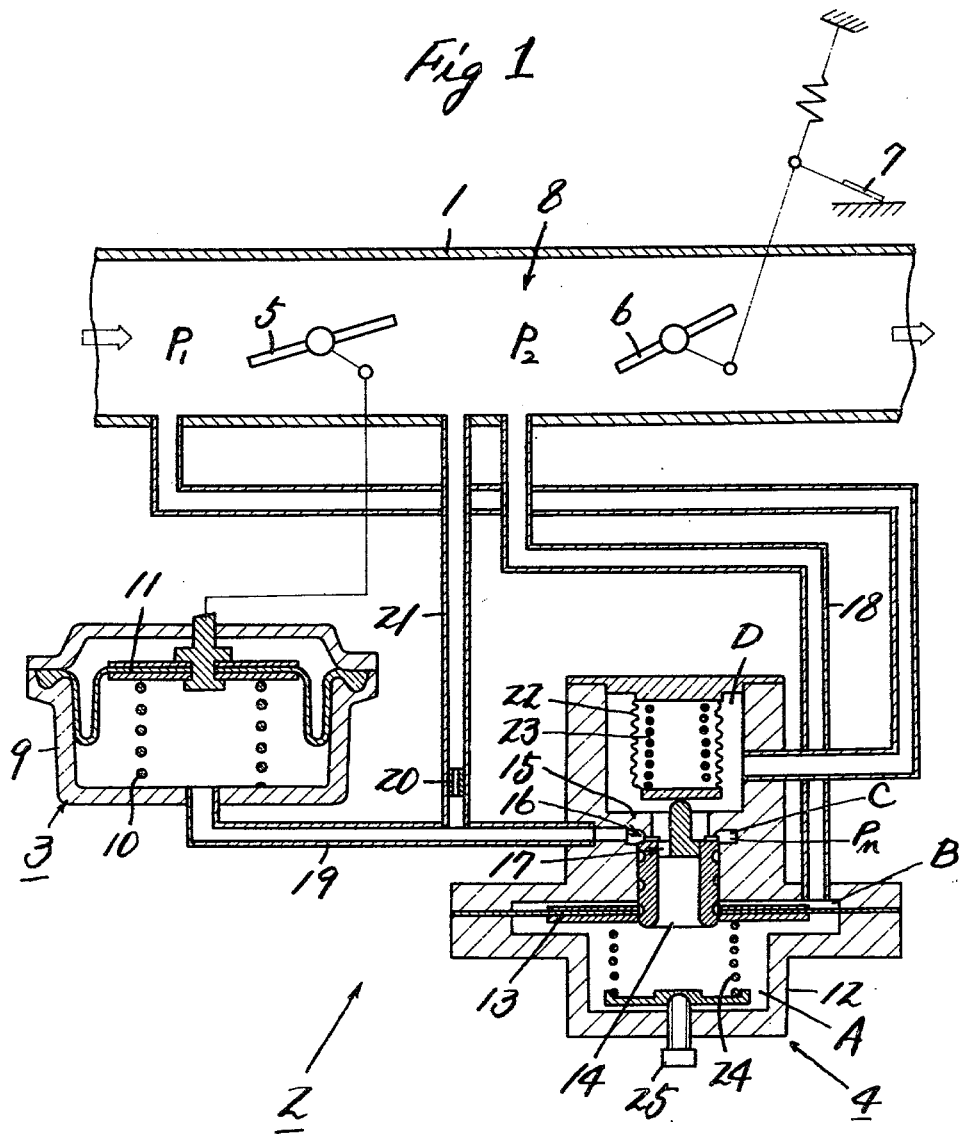
FIG. 1 is a schematic sectional view showing the principal components of an embodiment of the present invention.

FIG. 1 shows a preferred embodiment of the present invention, wherein 1 designates the air suction pipe of an engine and 2 designates a feedback control mechanism constituted by a valve opening device 3 and a pressure-sensitive amplifier device 4. Placed in said air suction pipe 1 and serving as air throttle valves are an upstream valve 5 and a downstream valve 6. For example, the upstream valve 5 may be a flow detection valve connected to the valve opening device 3, while the downstream valve 6 may be a flow regulating valve connected to the accelerator pedal 7. In addition, the two valves 5 and 6 may be used in a way opposite to that described above. That is, the upstream valve 5 may be connected to the accelerator pedal 7 and the downstream valve 6 to the valve opening device 3.

Let $P_1$ be the air pressure on the upstream side of the upstream valve 5 and $P_2$ be the pressure in an intermediate chamber 8 defined between the upstream and downstream valves 5 and 6. If the pressure difference $(P_1-P_2)$ is kept constant at all times, then it follows that the amount of flow of air is proportional to the opening area of the upstream valve 5. When the pressure difference $(P_1-P_2)$ deviates from a certain value, it is the pressure-sensitive amplifier device 4 that detects and amplifies such deviation and it is the upstream valve 5 that directly controls the opening and closing of the upstream valve 5. Installed in the main body 9 of the valve opening device 3 is a diaphragm 11 acted on by a spring 10, the movable portion of said diaphragm 11 being connected to the upstream valve 5 as by a link. The interior of the main body 12 of the pressure-sensitive amplifier device 4 is divided into two chambers A and B by a pressure difference setting diaphragm 13, the movable portion of the pressure difference setting valve 13 having a valve 14 connected thereto. The valve 14 cooperates with its seat 15 to define a variable orifice 16 whose opening area is varied by the displacement of the valve 14. The variable orifice 16 interconnects chambers C and D. Designated at 17 is a hole through which the chambers A and D communicate with each other. In addition, the chamber A and D may be interconnected by a suitable pipe. The chamber B is connected to the intermediate chamber 8 by a pipe 18, while the chamber C is connected to the intermediate chamber 8 by a pipe 21. Because of the construction described above, the chambers A and D are kept at the air pressure $P_1$ of the upstream side and the chamber B is kept at the air pressure $P_2$ in the intermediate chamber.

The pressure-sensitive amplifier 4 is arranged principally to detect the deviation (error) of the pressure $(P_1-P_2)$, and the compensation for air pressure and temperature is made by a bellows 22 installed in the pressure-sensitive amplifier device 4. The bellows 22 encloses a gas at a reference temperature and under a reference pressure and has its one end in contact with the valve 14 side so as not to be separated therefrom and the other end fixed to the main body 12. Pressure difference setting springs 23 and 24 act on the bellows 22 and the pressure difference setting diaphragm 13. In addition, the construction of the bellows will be later described.

The principle of the operation of the present inventive device constructed in the manner described above will now be described.

If the pressure difference $(P_1-P_2)$ deviates from a certain predetermined value even slightly, the pressure difference setting diaphragm 13 is displaced to move the valve 14, so that the opening area of the variable orifice 16 between the chambers C and D varies and the pressure $P_n$ in the chamber C varies between $P_1$ and $P_2$. In this connection, it is to be mentioned that a displacement of a little over 10 microns of the pressure difference setting diaphragm 13 is enough to cause the pressure $P_n$ to vary from approximately $P_1$ to $P_2$. In addition, the springs 23 and 24 installed in the chambers A and D have their spring pressures set so that they are balanced by the air pressures $P_1$ and $P_2$. Spring pressure adjustment is possible by an adjusting screw 25, and in the balanced condition, the variable orifice 16 is in a slightly opened condition.

When the pressure difference $(P_1-P_2)$ deviates to cause the pressure $P_n$ in the chamber C to vary, the diaphragm 11 of the valve opening device 3 communicating therewith is displaced and eventually the upstream valve 5 acts in such a direction as to correct the deviation.

Let Q be the weight rate of air flow through the upstream valve 5, S be the opening area of the upstream valve 5, $P_d$ be the pressure difference $(P_1-P_2)$, g be the acceleration of gravity, K be the flow coefficient of the valve, and $\gamma$ be the specific weight of air. Then, $$Q = KS\sqrt{2g P_d \gamma} \qquad (1)$$

In this case, the specific gravity $\gamma$ changes with pressure and temperature. If, therefore, the weight rate of air flow Q is measured from the opening area S with the pressure difference $P_d$ kept constant, an error due to variations in $\gamma$ will be produced. Therefore, it becomes necessary to make compensation by varying $P_d$ with variations in $\gamma$ so as to keep $P_d\gamma$ at a constant value. It is the bellows 22 that automatically makes this compensation, and the following conditions must be met.

Let $S_1$ be the effective area of the pressure difference setting diaphragm 13, $P_{dO}$ be the pressure difference at reference temperature and pressure, $S_2$ be the effective area of the bellows, and $P_O$ be the enclosed reference gas pressure. Then, it is necessary to satisfy the relation $S_1 P_{dO} = S_2 P_O$. Then, $P_d\gamma$ becomes approximately constant regardless of varioations in temperature and pressure, according to Boyle-Charle's law.

Thus, if $P_d =$ constant, then, from the equation (1), $$\Delta(\gamma P_d) = P_{dO}\Delta\gamma + \gamma_O \Delta P_d = 0 \qquad (2)$$

On the other hand, according to Boyle-Charle's law concerning incoming air, $$\gamma = P/RT \qquad (3)$$

where R is gas constant, T is absolute temperature and P is pressure. From the equation (3).

$$\frac{\Delta\gamma}{\Delta\gamma_O} = \frac{\Delta P}{P_O} - \frac{\Delta T}{T} \qquad (4)$$

Further, since the volumetric change of the bellows 22 is small enough to be negligible even if temperature and pressure change, and since $P/T =$ constant, the pressure change $\Delta P_b$ of the gas in the bellows 22 is expressed as follows.

$$\frac{P_b}{P_O} = \frac{T}{T} \qquad (5)$$

Since the condition which makes the volumetric change of the bellows small enough to be negligible is that the increment of force $\Delta P_b S_2$ due to the pressure in the bellows acting on the end surface of the bellows is equal to the sum of the force $\Delta P_b S_2$ due to the increment of pressure difference acting on the pressure difference setting diaphragm and the force $\Delta P S_2$ due to the increment of external pressure acting on the bellows, $$\Delta P_b S_2 = \Delta P S_2 + \Delta P S_1 \qquad (6)$$

Therefore, from the equation (2), (4), (5) and (6), $$S_1 Pd_O = S_2 P_O \qquad (7)$$

Thus, when the equation (7) is satisfied, it follows that Pdγ becomes constant regardless of the temperature and pressure of suction gas.

The above condition is established when the range of displacement of the pressure difference setting diaphragm is a little over 10 microns and when the volumetric change of the bellows is negligible, and it can be set independently of the springs 23 and 24 used for pressure difference setting. When Pdγ is kept constant as described above, the weight rate of suction air flow becomes proportional to the opening area of the upstream valve. If, therefore, the fuel flow control mechanism is connected so that it is proportional to the opening area S, the ratio of suction air to fuel can be kept constant regardless of the temperature and pressure of the atmosphere.

In addition, the bellows and the spring 23 have been shown disposed in parallel with each other on the same side of the pressure difference setting diaphragm, it being noted that they cannot be placed in series since this causes the volumetric change of the bellows according to its resilience as a result of changes in the temperature and pressure of suction air and since the conditions which compensate for temperature and pressure by enclosing a gas in the bellows disappear. Further, the adjusting screw 25 is provided for pressure difference setting, but it can also be utilized for air-fuel ratio compensation when the engine is at a low temperature or is accelerating or decelerating.

Further, the spring 24 for pressure difference setting may be omitted so long as the lower portion of the bellows is maintained unseparable from the valve 14 fixed to the movable portion of the pressure difference setting diaphragm. In that case, the adjusting screw 25 may be arranged so that it directly pushes up the bottom of the bellows. Further, the resilience of the bellows itself may be utilized instead of using the pressure difference setting springs 23 and 24.

FIG. 2 shows another embodiment of the invention, wherein the chamber C is provided below the pressure difference setting diaphragm 13 so that a decrease in the pressure in the chamber B, namely, the pressure P$_2$ in the intermediate chamber 8 may displace the valve 14 upwardly to open the variable orifice 16. In this case, the control output P$_n$ acts on the upper chamber 26 of the valve opening device 3. In addition, the lower chamber 27 communicates with a fixed choke 28 provided in the diaphragm 11 secured to the flow detection valve 5 and also communicates with the intermediate chamber 8 through a pipe 29.

FIG. 3 shows another modification of the invention, wherein a valve 30 interlocked to the pressure difference setting diaphragm 13 is in the form of a sphere guided by the cylindrical portion 32 of a valve chamber 31 integral therewith and a variable orifice 34 is defined between it and a spherical inner surface 33. The use of a sphere as the valve in this way assures that the displacement of the pressure difference setting diaphragm is satisfactorily followed by the change of the opening area of the variable orifice.

As has been described so far, according to the present invention, satisfying the condition $S_1 Pd_O = S_2 P_O$ is enough to compensate for variations in the density of suction air caused by variations in its temperature and pressure by means of a single compensation system. Therefore, the compensation system for temperature and pressure is greatly simplified and inexpensive. Further, the compensation system is fully automatic and highly accurate.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. In an internal combustion engine having a fuel control unit, air suction pipe means and pedal accelerator means, the improvement of a suction air flow measuring device of the weight-rate of flow type, said measuring device comprising an upstream valve positioned in the air suction pipe means, a downstream valve positioned in the air suction pipe means, and in series downstream from said upstream valve, one of the said upstream valve and the said downstream valve serving as a flow detection valve with the other of the valves serving as a flow regulating valve, one of the said upstream valve and said downstream valve defining an area flowmeter for determining the amount of incoming air flow on the basis of the opening area of the valve serving as the flow detection valve by keeping the difference in the pressure existing on opposite sides of the valve serving as the flow detection valve constant; pressure-sensitive amplifier means operatively associated with said defined area flowmeter, said amplifier means including a first chamber communicating with the upstream side of the valve serving as the flow detection valve, a second chamber communicating with the downstream side of the valve serving as the flow detection valve, said pressure difference setting diaphragm being disposed between the two chambers to partition them and positioned so that the relationship of pressures applied thereon keeps its balance under a selected reference pressure difference and a variable flow orifice having an opening area which is varied in association with the movement of the diaphragm so as to vary an output or control pressure to the valve opening device, said valve opening device being operatively connected with the valve serving as the flow detection valve to operate the same in the opening and closing direction with the output from the amplifier means, said variable orifice being a spool valve fixed to the pressure difference setting diaphragm and having a valve seat fixed to a main body, said pressure-sensitive amplifier means and said valve opening means defining a flow servomechanism, one of the upstream valve and the downstream valve serving as the flow regulating valve being operatively connected to the pedal accelerator means with the other of the valves serving as the flow control valve being operatively connected to the fuel control unit; and gas-filled bellows means operatively connected to the pressure difference setting diaphragm of said amplifier means whereby said association of said defined area flowmeter, said defined flow servomechanism, and said bellows means will be such that the product of the effective area of said pressure difference setting diaphragm of said pressure-sensitive amplifier means and a reference pressure difference is equal to the product of a reference pressure of the gas enclosed in said bellows means and the effective area of said bellows means.

2. A device for measuring the mass rate of flow of a gas flowing in a channel comprising a flow detection valve positioned in the channel, a feedback control mechanism operatively associated with said flow detection valve, said mechanism comprising a pressure-sensitive amplifier unit and a valve actuating unit, said feedback control unit being operable to maintain constant the pressure difference across the flow detection valve so that the degree of opening of the flow detection valve is made proportional to the amount of the gas past the same valve, said pressure-sensitive amplifier unit having a variable-area orifice which is under the control of a pressure difference setting diaphragm for producing an actuating pressure which actuates the valve actuating means operatively connected to the flow detection valve so that the pressure difference is maintained at a predetermined value, a chamber connected to a portion of the channel downstream of the detection valve through a first conduit and a chamber isolated from the first said chamber by the pressure difference setting diaphragm and connected to a portion of the channel upstream of the detection valve through a second conduit, a valve body constituting the variable-area orifice connected to the pressure difference setting diaphragm which is acted on by a compensation mechanism so as to compensate for variations in the specific gravity of the gas flowing in the channel owing to pressure and temperature variations, the compensation mechanism comprising a bellows located in a chamber conducting the gas flowing in the channel, said bellows being filled with a given mass of a certain gas in such a manner that when the gas being measured and surrounding the bellows is at its reference temperature, the gas pressure in the bellows becomes equal to a reference pressure of the gas being measured, and that the product of the effective pressure-sensitive area of the pressure difference setting diaphragm and the pressure difference across the detection valve is equal to the product of the effective pressure-sensitive area of the bellows and the gas pressure in the bellows, in which device said bellows is operatively connected to the pressure difference setting diaphragm of the amplifier means so that a force produced by said bellows acts as a mechanical counterforce to push against a force produced by the diaphragm due to the pressure difference, and in which device a pressure difference setting spring cooperates with the bellows, said spring being so located that a force produced by the bellows in response to alteration in temperature and pressure of the gas flowing in the channel and a force of said spring operate upon the pressure difference setting diaphragm in parallel with each other.

3. In an internal combustion engine having a fuel control unit, air suction pipe means and pedal accelerator means, the improvement of a suction air flow measuring device of the weight-rate of flow type, said measuring device comprising an upstream valve positioned in the air suction pipe means, a downstream valve positioned in the air suction pipe means and in series downstream from said upstream valve, one of the said upstream valve and the downstream valve serving as a flow detection valve with the remaining valve serving as a flow regulating valve, one of the said upstream valve and said downstream valve defining an area flowmeter for determining the amount of incoming air flow on the basis of the opening area of the valve serving as the flow detection valve by keeping the difference in the pressure existing on opposite sides of the valve serving as the flow detection valve constant; pressure-sensitive amplifier means operatively associated with said defined area flowmeter, said amplifier means including a pressure difference setting diaphragm means for detecting and amplifying the deviation of the pressure difference that may occur in the defined area flowmeter, a valve opening means operatively associated on one side with said pressure sensitive amplifier means and on the other side with one of the upstream valve and the downstream valve functioning as the flow detection valve for controlling the opening and closing of the flow detection valve by the output from the pressure-sensitive amplifier means, said pressure-sensitive amplifier means and said valve opening means defining a flow servomechanism, the one of the upstream valve and the downstream valve serving as the flow detection valve being operatively connected to the fuel control unit with the other of the valves serving as the flow regulating valve being operatively connected to the pedal accelerator means; and gas-filled bellows means operatively connected to the pressure difference setting diaphragm of said amplifier means so that a force produced by said bellows means acts as a mechanical counterforce to push against a force produced by the diaphragm due to the pressure difference, whereby said association of said defined area flowmeter, said defined flow servomechanism, and said bellows means will be such that the product of the effective pressure-sensitive area of said pressure difference setting diaphragm of said pressure-sensitive amplifier means and a reference pressure-difference is equal to the product of a reference pressure of the gas enclosed in said bellows means and the effective pressure-sensitive area of said bellows means.

4. In an internal combustion engine in accordance with claim 3, wherein said amplifier means includes a first chamber communicating with the upstream side of the valve serving as the flow detection valve, a second chamber communicating with the downstream side of the valve serving as the flow detection valve, said pressure difference setting diaphragm being disposed between the two chambers to partition them and positioned so that the relationship of pressures applied thereon keeps its balance under a preselected reference pressure difference and a variable flow orifice having an opening area which is varied in association with the movement of the diaphragm so as to vary an output or control pressure to the valve opening means, said valve opening means being operatively connected with the valve serving as the flow detection valve to operate the same in the opening and closing direction with the output from the amplifier means, and wherein said bellows means is located within one of said first and second chambers of the amplifier means, said bellows means being filled with a given mass of a gas in such a manner that when the intake air surrounding the bellows is at its reference pressure, the gas pressure in the bellows becomes equal to a reference pressure of the intake air.

5. In an internal combustion engine in accordance with claim 3, wherein said pressure-sensitive amplifier means comprises an upstream pressure chamber defined by the pressure difference setting diaphragm and acted on by the pressure existing on the upstream side of the valve serving as the flow detection valve, an intermediate chamber defined between the valve serving as the flow detection valve and the valve serving as the flow control valve, a variable orifice whose opening area varies and which is interlocked to said pressure difference setting diaphragm, and a control chamber communicating with the upstream pressure chamber through said variable orifice.

6. In an internal combustion engine in accordance with claim 5, wherein said variable orifice being defined by cooperation between a sphere interlocked to the pressure difference setting diaphragm and a valve seat fixed to a main body.

* * * * *